United States Patent [19]

Schoneman

[11] Patent Number: 5,097,196
[45] Date of Patent: Mar. 17, 1992

[54] ZERO-VOLTAGE-SWITCHED MULTIRESONANT DC TO DC CONVERTER

[75] Inventor: George K. Schoneman, Cedar Rapids, Iowa

[73] Assignee: Rockwell International Corporation, El Segundo, Calif.

[21] Appl. No.: 705,230

[22] Filed: May 24, 1991

[51] Int. Cl.$^5$ .............................................. G05F 1/618
[52] U.S. Cl. ................................... 323/222; 323/224; 323/235; 323/271
[58] Field of Search ............... 323/222, 224, 235, 271, 323/282, 285, 300, 319, 351

[56] References Cited

U.S. PATENT DOCUMENTS

| | | | |
|---|---|---|---|
| 4,720,667 | 1/1988 | Lee et al. | 323/271 |
| 4,841,220 | 6/1989 | Tabisz et al. | 323/235 |
| 4,857,822 | 8/1989 | Tabisz et al. | 323/282 |
| 4,931,716 | 6/1990 | Jovanovic et al. | 323/224 |
| 4,959,764 | 9/1990 | Bassett | 323/282 |

*Primary Examiner*—Jeffrey Sterrett
*Attorney, Agent, or Firm*—John J. Horn; M. Lee Murran; H. Fredrick Hamann

[57] ABSTRACT

A multiresonant DC to DC converter which operates at a substantially fixed frequency yet maintains relatively constant efficiency levels despite wide variations in input voltage. The multiresonant converter includes a first transistor switch in series with the DC voltage supply source and the load and a second transistor switch in parallel with the DC voltage supply source and the load. The switching action of the first transistor switch is controlled as a function of the supply voltage input to the converter while the duty factor of the second transistor switch is controlled in accordance with the output voltage of the converter.

14 Claims, 3 Drawing Sheets

ZERO-VOLTAGE-SWITCHED MULTIRESONANT DC TO DC CONVERTER

BACKGROUND OF THE INVENTION

The present invention relates to DC to DC converters and where particularly to multiresonant DC to DC converters.

Multiresonant DC to DC converters employ reactive networks to shape the voltage waveforms across their switching transistors in order to allow these devices to turn on with either zero voltage or zero current. Switching losses are thereby substantially reduced allowing switching frequencies to be pushed into the megahertz range. High-frequency operation in turn allows smaller filter components to be used thereby reducing power supply volume.

Referring now to FIG. 1, a typical zero-voltage-switched multiresonant converter 10 is shown for receiving an input voltage $V_s$ from a voltage supply source 12 and supplying a regulated output voltage $V_0$ to a load 20. The switch $S_1$ ordinarily comprises metal oxide semiconductor field effect transistor (MOSFET) which includes an intrinsic drain-to-source diode that allows for control only when the current $i_l$ is positive. The diode D1 operates as a passive switch. The capacitors 14 and 16 operate in combination with the inductor 18 to form a reactive network which may assume different resonant circuit combinations depending on the conditions of the switch S1 and the diode D1. The inductor 22 and capacitor 24 form an output filter. This type of converter is regulated against output load and input line variations by adjustment of the switching frequency of the switch S1. Unfortunately, frequency variations on the order of two-to-one are ordinarily necessary to accommodate changes from zero load to full load.

Recently, a constant or fixed frequency version of the multiresonant converter was proposed by D. Maksimovic and S. Cuk in a paper entitled "Constant Frequency Control of Quasi-resonant Converters" presented at the fourth annual High Frequency Power Conversion Conference in 1989. Constant frequency operation is greatly preferred for use in conjunction with radio frequency equipment because the noise spectrum generated during fixed frequency operations is more predictable and because the inductors employed in the circuit can be optimally designed for the operation at a single frequency. Referring now to FIG. 2, a fixed frequency zero-voltage-switched multiresonant converter 30 is illustrated in which the diode D1, shown in the circuit of FIG. 1, has been replaced by a second transistor switch S2. In operation the switch S1 is regulated by the switching control circuit 26 to have both fixed on and fixed off times while the switch S2 is regulated by the switching control circuit 26 to have a duty factor which is a function of output voltage $V_0$. The switches S1 and S2 are synchronized for operation at a single fixed frequency. The second transistor switch S2 adds another degree of freedom to the control of the circuit thereby allowing the converter to be regulated while maintaining a constant frequency of operation. Unfortunately, fixed frequency zero-voltage-switched multiresonant converters such as the converter 30 are characterized by substantially decreased efficiency at higher voltage levels within their input voltage ranges. These efficiency losses occur because the power losses in the converter 30 primarily comprise conduction losses such as $I^2R$ losses in the transistor switches S1 and S2 and core and winding losses in the resonant inductor 18 which are all a function of the peak current in the inductor 18 which is in turn a strong function of the supply voltage $V_s$ since the supply voltage $V_s$ is applied directly to the inductor 18 when the switches S1 and S2 are both on.

It is therefore an object of the present invention to Provide a multiresonant converter which operates at a substantially constant frequency yet is characterized by stable efficiency levels as a function of input voltage.

It is another object of the present invention to provide a multiresonant converter having a substantially fixed frequency of operation in which the peak resonant current in the resonant inductor is maintained at a constant level despite variations in input voltage in order to control conduction losses and reduce voltage and current stresses on the circuit components.

It is a further object of the present invention to provide a multiresonant converter which operates at a substantially fixed frequency at high efficiency levels despite variations in input voltage by controlling the switching action of the transistor switches in the converter.

SUMMARY OF THE INVENTION

The present invention constitutes a multiresonant converter for generating a voltage regulated DC output signal for supply to a load from a DC input signal provided by a DC voltage supply source. The converter includes a first transistor switch connected in series with the DC voltage source and the load and a second transistor switch connected in parallel with the DC voltage source and the load. The converter also includes a reactive network interconnected with the transistor switches for shaping the voltage waveforms across the transistor switches. The converter further includes a control circuit for regulating the switching action of the first transistor switch as a function of the input voltage from voltage supply source and regulating the switching action of the second transistor switch as a function of the output voltage of the converter.

In the preferred embodiment, the multiresonant converter comprises a zero-voltage-switched converter and the reactive network includes a first capacitor connected in parallel with the first transistor switch, a second capacitor connected in parallel with the second transistor switch and an inductor connected in series with the DC voltage source, the load and both the first and second transistor switches. The first transistor switch is controlled to have a fixed off-time but a variable on-time which is an inverse function of the input voltage supplied by the voltage source. The second transistor switch is controlled to have a duty factor which is a function of the output voltage of the converter and is operationally synchronized with the first transistor switch.

In operation, the on time of the first transistor switch is decreased as a function of increasing input voltage which has the affect of stabilizing peak current levels through the resonant inductor in the reactive network. Since only limited variations in the switching frequency of the first transistor switch are required as its on-time is adjusted in accordance with input voltage the converter is thereby allowed to operate over a narrow frequency range at a substantially fixed frequency while converter efficiency levels are preserved.

DESCRIPTION OF THE PREFERRED EMBODIMENT

Figure 3:
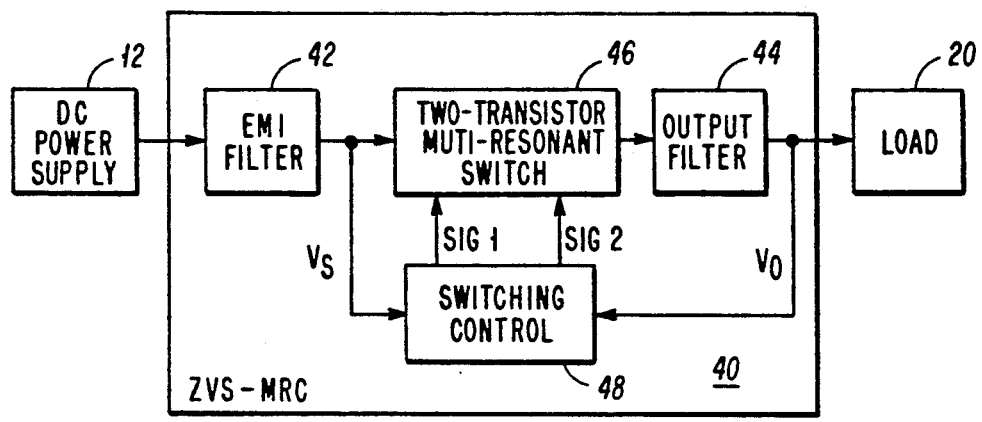
FIG. 3 provides an overall block diagram of multiresonant converter constructed in accordance with the principles of the present invention in which the efficiency of the converter is preserved against input voltage variations by regulating the switching action of a first transistor to maintain substantially constant peak resonant current through the resonant inductor in the multiresonant switch of the converter.

Referring now to FIG. 3, the present invention constitutes a zero-voltage-switched multiresonant converter 40 which receives an input voltage signal from the DC power supply 12 and provides a regulated DC output voltage signal to the load 20. The converter 40 comprises an input stage for receiving the DC voltage signal from the power supply 12 which ordinarily would include an electromagnetic interference filter 42 and an output stage for supplying the regulated DC output signal to the load 20 which includes an LC output filter 44. A two transistor multiresonant switch 46 is interposed between the input stage as represented by the filter 42 and the output stage as represented by the filter 44 for processing the signal provided by the power supply 12 (by way of the filter 42) and generating a regulated DC output signal for supply to the load 20 (by the way of the filter 44). The two transistor multiresonant switch 46 operates under control of the switching control circuit 48 which generates and supplies separate control signals SIG 1 and SIG 2 to the switch 46 in response to input signals representing the supply voltage $V_s$ and the output voltage $V_o$.

Figure 4:
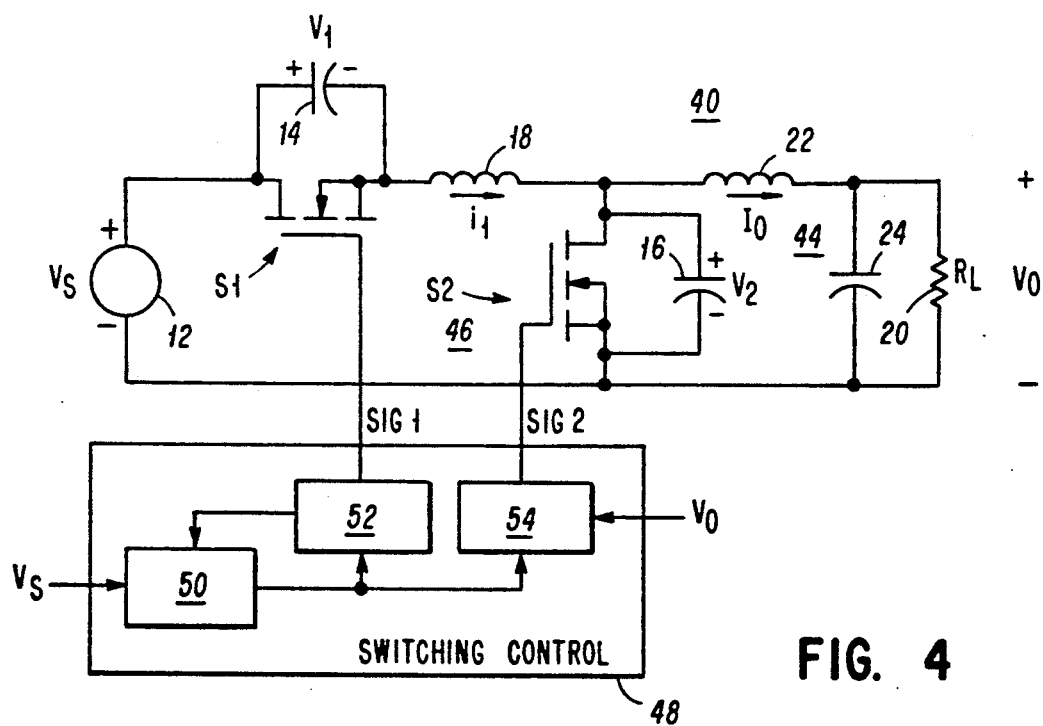
FIG. 4 provides a mixed schematic and block diagram further illustrating the details of a zero-voltage-switched multiresonant converter constructed in accordance with the principles of the present invention.

Referring now to FIG. 4, the two transistor multiresonant switch 46 includes the MOSFET switches S1 and S2 which have their switching action controlled by the switching control circuit 48. The multiresonant switch 46 also includes the capacitors 14 and 16 and the inductor 18 which form a reactive network adapted for shaping the voltage waveforms which are characteristic of the switches S1 and S2. The inductor 22 and the capacitor 24 comprise the output filter 44 from which the output voltage $V_0$ is supplied to the load 20. It should be noted that the inductor 22 must be sufficiently large to maintain a substantially steady current flow $I_0$ over a large number of switching cycles. The switching control circuit 48 is responsive to the input voltage $V_s$ from the power supply source 12 and the output voltage $V_0$ of the converter 40 to generate switching control output signals SIG1 and SIG2 for controlling the transistors S1 and S2, respectively. The switching control circuit 48 includes a sawtooth signal generating unit 50 for generating a sawtooth waveform signal having a ramp slope proportional to the input supply voltage $V_s$. The sawtooth signal is supplied to the processing components 52 and 54 which form the actual drive signals SIG1 and SIG2 which are supplied to the gates of the transistor switches S1 and S2, respectively. The processing component 52 generates the control signal SIG1 which regulates the switching action of the transistor switch S1 to have a fixed off-time but a variable on-time which is an inverse function of the supply voltage $V_s$. The processing component 54 generates the control signal SIG2 for controlling this switching action of the transistor switch S2 so that the signal is pulse width modulated to have a duty factor which is a function of the output voltage $V_0$ of the converter 40.

Figure 1:
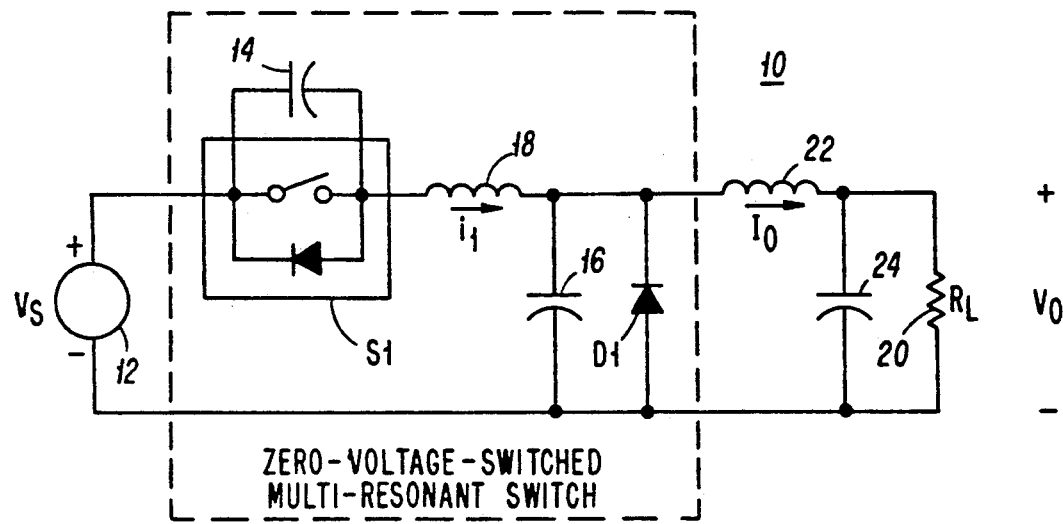
FIG. 1 provides a circuit diagram of a conventional zero-voltage-switched multiresonant converter in which the output voltage of the converter is regulated against output load and input voltage variations by varying the frequency of the switching action in the device.
Figure 2:
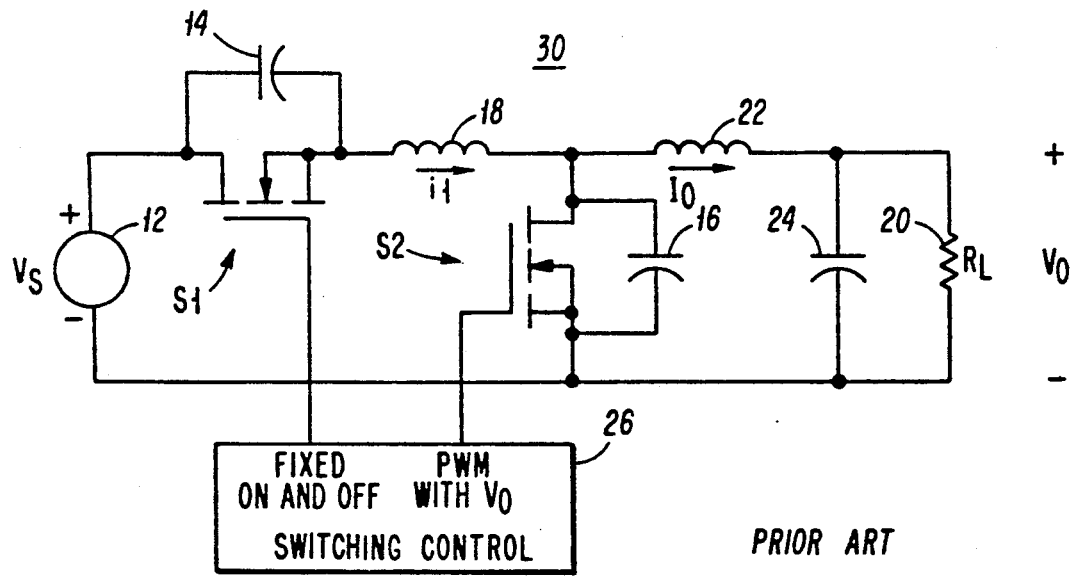
FIG. 2 provides a schematic diagram of a fixed frequency zero-voltage-switched multiresonant converter having two transistor switches in which the output voltage of the converter is regulated against output load and input voltage variations changing the duty factor associated with the switching action by one of the transistors in the device.
Figure 6:
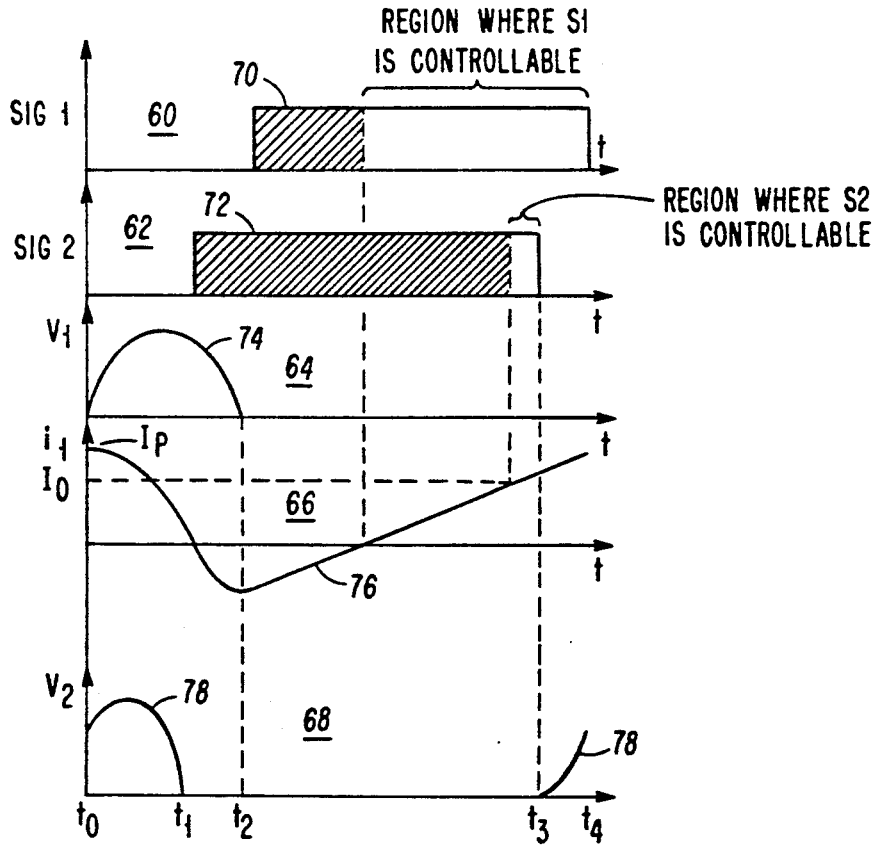
FIG. 6 provides a set of graphs showing plots of important voltage and functions for zero-voltage-switched multiresonant converters over a single switching cycle along the horizontal time axis shown in the figure.

Referring now to FIG. 6 and also with reference to FIGS. 2 and 4, the advantages of the present invention with respect to the prior art may be better understood by examining the operation of the circuits shown in FIGS. 2 and 4 with respect to the steady state waveforms shown in FIG. 6. It should be noted that the waveforms plotted in FIG. 6 correspond to the Primary switching sequence for the transistor switches S1 and S2 in the converters 30 and 40 which represents the desired mode of operation of the converters but not the exclusive mode of operation for these devices. FIG. 6 includes five separate graphs 60, 62, 64, 66 and 68 which are plotted along the same time axis for purposes of illustrating the sequence of events which are characteristic of the operation of the converters 30 and 40 over a single switching cycle for these devices. The graphs 60 and 62 show plots 70 and 72 of the voltages for the gate-drive control signals SIG1 and SIG2 which regulate the switching action of the transistor switches S1 and S2. The graphs 64 and 68 show plots 74 and 78 of the voltages $V_1$ and $V_2$ across the transistor switches S1 and S2. The graph 66 shows a plot 76 of the current $i_l$ through the resonant inductor 18.

At a time $t_0$ a new switching cycle begins as the transistor switch S1 turns off. Assuming that transistor switch S2 is already in the off state, a resonance occurs between the inductor 18, the capacitor 14 and the capacitor 16. The voltages $V_1$ and $V_2$ across the capacitors 14 and 16 increase in a resonant fashion as the current $i_l$ in the inductor 18 decreases to zero and begins going negative (i.e. flowing in the opposite direction). At the time $t_l$ the voltage $V_2$ across the transistor switch S1 resonates back to zero and the switch S2 turns on because of the inherent drain-to-source diode present in the MOSFET making up the switch (It should be noted at this point that depending upon load and input line conditions the switch S1 could turn on before the switch S2 in a different mode of operation although this would not affect the basic operation of the converter). At the time $t_2$ the voltage $V_1$ cross the transistor switch S1 resonates to zero and the transistor switch S1 turns on in the same way as a result of the action of its inherent drain-to-source diode. The current $i_l$ in the inductor 18 begins to linearly ramp up since the voltage $V_1$ is applied directly across the inductor 18. Gate-drive (SIG1) must be applied to the transistor switch S1, so that it can conduct in the forward direction before $i_l$ reaches zero and begins to go positive. The transistor switch $S_1$ cannot be turned off until $i_l$ is positive. Correspondingly, gate-drive (SIG2) must be applied to transistor switch S2 before $i_l$ reaches $I_0$. Any time after $i_l$ becomes greater than $I_0$ positive current is flowing in transistor switch S2 and switch S2 can be turned off. The turn off time $t_3$ of transistor switch $S_2$ relative to $t_l$ is the control variable that enables the output of the converter to be regulated. For increases in $I_0$ or decreases in $V_s$, the time difference between $t_3$ and $t_l$ must be decreased to maintain a constant output voltage $V_0$. Looking at this in a different (although somewhat simplistic) way, when the transistor switch S2 is off for a longer period of time the voltage source is connected to the output over a longer period of time. The turn off time $t_4$ (Note: $t_4 = t_0$) of transistor switch S2 is the control variable that enables the resonant current in the multiresonant switch to be regulated. For increases in $V_s$, the time difference between $t_4$ and $t_2$ must be decreased to maintain constant peak current levels in the inductor 18. Looking at this in a different (although somewhat simplistic) way, when transistor switch S1 is on for lesser period of time the voltage supply 12 is connected across the inductor 18 for a shorter period of time.

Figure 5:
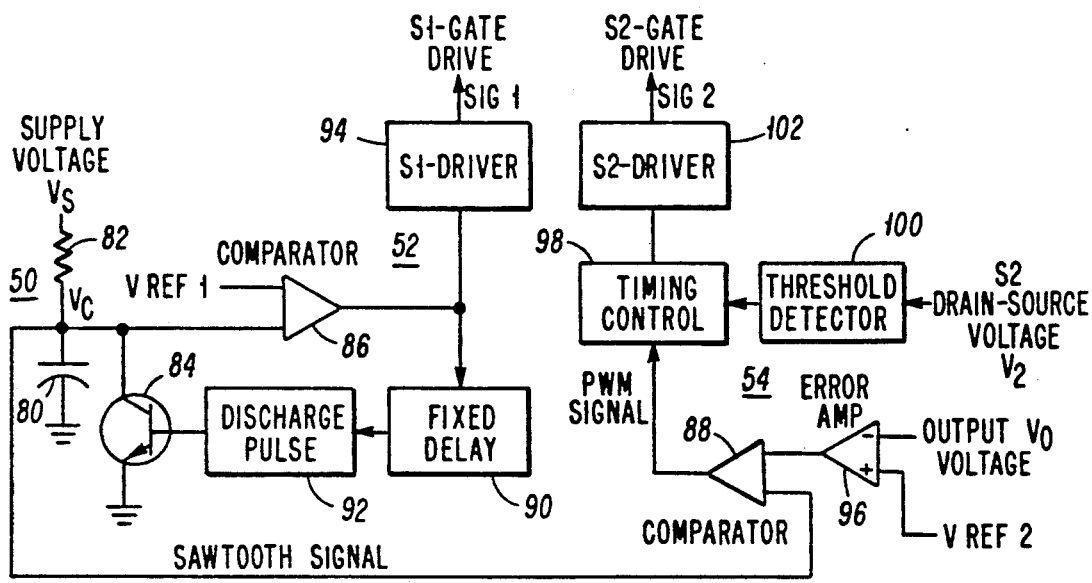
FIG. 5 provides a mixed schematic and block diagram showing further details of the switching control circuit shown in FIGS. 3 and 4 which generates the control signals for driving the transistors switches in the multiresonant switch of the converter of the present invention in response to the levels of the supply voltage and the output voltage of the converter.

Referring now to FIG. 5, the switching control circuit 48 includes a capacitor 80 which is connected at one terminal to ground and which is connected at its other terminal to the DC voltage supply source 12 through a resistor 82. The supply voltage $V_s$ is thereby used to charge the capacitor 80 with a substantially constant current flow being determined by the resistor 82 given that the time constant for the RC combination involved is very much longer than the duration of an average switching cycle for the converter. Under the influence of the supply voltage $V_s$, the capacitor voltage $V_c$ ramps upward with a slope which is proportional to the level of the supply voltage $V_s$ to the point at which the capacitor 80 is discharged by the transistor 84 as will be further described hereinafter thereby forming a sawtooth signal which is supplied to the comparator 86 in the processing component 52 and the comparator 88 in the processing component 54.

The comparator 86 compares the voltage level of the sawtooth signal ($V_c$) to the voltage level of a reference signal $V_{ref1}$ and provides a high level output signal whenever the sawtooth signal ($V_c$) exceeds the reference signal $V_{ref1}$ in voltage. The output of the comparator 86 is supplied to a delay circuit 90 such as a one shot multivibrator which in turn controls a pulse generator 92. The delay circuit 90 provides a high level output signal to the pulse generator after a fixed delay period corresponding to the desired off time of the transistor switch S1 at which point the pulse generator 92 provides a very short pulse to the transistor 84 whereby the capacitor 80 is fully discharged to ground. The output of the comparator 86 is also supplied to a driver 94 which may include one or more power MOSFETs acting as buffers and drivers for generating the final control signal SIG1 for driving the transistor switch S1.

The error amplifier 96 compares the output voltage $V_0$ of the converter to a second voltage reference signal $V_{ref2}$ corresponding to the desired voltage output level of the converter. The error amplifier 96 provides an error signal to the comparator 88 which compares the voltage level of this error signal with the voltage level of the sawtooth signal ($V_c$) Produced by the generator 50 and thereby generates a pulse width modulated signal having a duty factor which is a function of the output voltage $V_0$. The pulse width modulated output of the comparator 88 is supplied to a timing control circuit 98 which controls the exact timing of when drive is applied to the gate of the transistor S2 in accordance with the drain-to-source voltage $V_2$ across the transistor switch S2. The voltage $V_2$ is supplied to the threshhold detector 100 which senses when this voltage reaches the zero voltage level and provides a signal indicative of this event to the timing control circuit 98. In response to the signal from the threshold detector 100 the timing control circuit 98 adjusts the position of leading edge of the pulse width modulated signal from the comparator 88. Current flow through the intrinsic diode of the transistor switch S2 is thereby bypassed and directed through the flow channel of the MOSFET comprising the switch S2 in order to avoid the increased voltage drop which is characteristic of the intrinsic diode and which would otherwise cause some increase in power loss in the converter. The timing control circuit 98 provides an adjusted pulse width modulated signal to the driver 102 which includes one or more power MOSFETs acting as buffers and drivers for generating the control signal SIG2 for driving the transistor switch S2.

The control system of the present invention eliminates the degradation in efficiency with increased input voltages which would ordinarily be experienced by fixed frequency multiresonant converters and allows such converters to operate with constant power dissipation across a wide input voltage range. Input voltage is sensed and this information is used to vary the on time of the transistor switch S1 such that constant peak resonant current $I_p$ in the inductor 18 is maintained despite variations in the supply voltage $V_s$ thereby allowing constant efficiency to be maintained over a wide supply voltage range. Since the off time of the transistor switch S1 is held constant, the transistor switch S1 is subject to variable frequency control. However, this frequency variation is ordinarily small ($+/-10\%$) compared to the normal frequency variations experienced with conventional variable frequency zero-voltage-switched multiresonant converters. Feedback from the output of the converter is used to control the duty factor of the transistor switch S2 in order to provide regulation against load and input voltage variation as is normally done in zero-voltage-switched multiresonant converters. The off time of the transistor switch S2 is adjusted so that sufficient time is allowed for the voltage $V_2$ to resonate to zero for all load and line conditions before drive is applied to the gate of the transistor switch S2. As a further refinement, the drain-to-source voltage $V_2$ of the transistor switch S2 can be sensed and drive applied to the gate of the switch S2 when this voltage reaches the zero level in order to avoid the somewhat higher power losses associated with current flow through the intrinsic diode in the MOSFET switch S2.

While particular embodiments of the present invention have been shown and described, it should be clear that changes and modifications may be made to such embodiments without departing from the true scope and spirit of the invention. It is intended that the appended claims cover all such changes and modifications.

I claim:

1. A zero-voltage-switched multiresonant converter for generating a regulated DC output voltage for supply to a load from a DC input voltage provided by a DC voltage source, comprising:
   a first transistor switch connected in series with said DC voltage source and said load;
   a second transistor switch connected in parallel with said DC voltage source and said load;
   a first capacitor connected in parallel with said first transistor switch;
   a second capacitor connected in parallel with said second transistor switch;
   a first inductor connected in series with said DC voltage source, said load and both of said first and second transistors switches;
   means coupled to the gate of said first transistor switch for controlling switching of said first transistor switch as a function of the input voltage provided by said voltage source to said converter for stabilizing the current through said first inductor; and
   means coupled to the gate of said second transistor switch for controlling switching of said second transistor switch as a function of the output voltage of said converter.

2. The zero-voltage-switched multiresonant converter of claim 1, wherein said first and second transistor switches comprise metal oxide semiconductor field affect transistors (MOSFETs).

3. The zero-voltage-switched multiresonant converter of claim 2, wherein said means for controlling the switching of said first transistor switch is further operative for regulating the switching of said first transistor switch to Provide a fixed off time and a variable on time which is an inverse function of said input voltage.

4. The zero-voltage-switched multiresonant converter of claim 3, wherein said means for controlling said first transistor switch includes:
   a third capacitor which is connected at one terminal through a resistor to said voltage source so as to allow a substantially constant current to be supplied to said capacitor and which is connected at its other terminal to ground,
   means for comparing the voltage across said third capacitor to a fixed reference level and generating an off control signal for supply to said first transistor switch when said voltage across said comparator exceeds said fixed reference level, and
   means for discharging said capacitor to ground upon the expiration of a fixed time period after said voltage across said capacitor exceeds said fixed reference level and said off control signal is supplied to said first transistor switch.

5. The zero-voltage switched multiresonant converter of claim 3, wherein said means for controlling the switching of said second transistor switch includes:
   an error amplifier for comparing said output voltage of said converter to a reference voltage in order to generate an error signal, and
   comparator means for comparing said error signal to the voltage across said capacitor in order to produce a pulse width modulated control signal for use in controlling the switching of said second transistor switch.

6. A process for controlling the switching action in a zero-voltage-switched multiresonant DC to DC converter which is operative for generating a regulated output voltage for supply to a load from an unregulated input voltage supplied by a voltage source and which includes a first transistor switch in series with said load and a second transistor switch in parallel with said load, said process comprising the steps of:
   regulating the duty factor of said first transistor switch as it is switched on and off at high frequency as an inverse function of the input voltage supplied by said voltage source; and
   regulating the duty factor of said second transistor switch as it is switched on and off at high frequency as a function of the output voltage supplied to said load.

7. The process of claim 6, wherein said step of regulating the duty factor of said first transistor switch includes the substeps of:
   generating a sawtooth voltage signal having a ramp slope proportional to said input voltage by applying a corresponding input current to a capacitor and periodically discharging said capacitor,
   comparing said sawtooth voltage signal to a fixed reference voltage in order to produce a signal suitable for use in controlling said first transistor switch, and
   regulating the discharge of said capacitor to occur upon the expiration of a fixed time period from when said sawtooth voltage exceeds said fixed reference voltage.

8. The process of claim 6, wherein said first and second field effect transistors comprise metal oxide semiconductor field effect transistors.

9. A multiresonant converter for converting a DC input signal from a voltage supply source to a regulated DC output signal for supply to a load, said converter comprising:
   an input stage for receiving said DC input signal;
   an output stage for imposing said DC output signal across said load;
   a first transistor switch interposed between said input and output stages in series with said voltage supply source and said load;
   a second transistor switch interposed between said input and output stages in parallel with said voltage supply source and said load;
   reactive means interposed between said input and output stages for allowing said transistor switches to be switched on at zero-voltage levels;
   means for controlling the switching action of said first switch as a function of said DC input signal;
   means for controlling the switching action of said second switch as a function of said DC output signal.

10. The multiresonant converter of claim 9, wherein said reactive means includes:
    a first capacitor connected in parallel with said first transistor,
    a second capacitor connected in parallel with said second transistor, and
    an inductor connected in series with said first and said second transistors.

11. The multiresonant converter of claim 9, wherein said first and second transistor switches comprise metal oxide semiconductor field effect transistors (MOSFETs).

12. The zero-voltage-switched multiresonant converter of claim 10, wherein said means for controlling the switching of said first transistor switch is further operative for regulating the switching of said first transistor switch to provide a fixed off time and a variable on time which is an inverse function of the voltage of said DC input signal.

13. The zero-voltage-switched multiresonant converter of claim 10, wherein said means for controlling said first transistor switch includes:
   a third capacitor which is connected at one terminal through a resistor to said voltage supply source so as to allow a substantially constant current to be supplied to said capacitor and which is connected at its other terminal to ground,
   means for comparing the voltage across said third capacitor to a fixed reference level and generating an off control signal for supply to said first transistor switch when said voltage across said comparator exceeds said fixed reference level, and
   means for discharging said capacitor to ground upon the expiration of a fixed time period after said voltage across said capacitor exceeds said fixed reference level and said off control signal is supplied to said first transistor switch.

14. The zero-voltage switched multiresonant converter of claim 13, wherein said means for controlling the switching of said second transistor switch includes:
   an error amplifier for comparing said output voltage of said converter to a reference voltage in order to generate an error signal, and
   comparator means for comparing said error signal to the voltage across said capacitor in order to produce a pulse width modulated control signal for use in controlling the switching of said second transistor switch.

* * * * *